United States Patent
Westermeyer et al.

(10) Patent No.: US 8,914,985 B2
(45) Date of Patent: Dec. 23, 2014

(54) LIGHT BEAM EMISSION DEVICE FOR A MEASURING DEVICE AND METHOD FOR CHANGING THE OPTICAL PROPERTIES OF A LIGHT BEAM

(71) Applicant: Trimble Kaiserslautern GmbH, Kaiserslautern (DE)

(72) Inventors: Gereon Westermeyer, Kaiserslautern (DE); Christian Ritter, Eisenberg (DE)

(73) Assignee: Trimble Kaiserslautern GmbH, Kaiserslautern (DE)

( * ) Notice: Subject to any disclaimer, the term of this patent is extended or adjusted under 35 U.S.C. 154(b) by 204 days.

(21) Appl. No.: 13/657,654

(22) Filed: Oct. 22, 2012

(65) Prior Publication Data
US 2013/0111770 A1    May 9, 2013

(30) Foreign Application Priority Data
Nov. 4, 2011    (DE) .......................... 10 2011 085 761

(51) Int. Cl.
 G01C 15/00    (2006.01)
 G01C 3/02    (2006.01)
(52) U.S. Cl.
 CPC ... *G01C 3/02* (2013.01); *Y10S 33/21* (2013.01)
 USPC .......................... 33/290; 33/DIG. 21; 359/800
(58) Field of Classification Search
 USPC ............ 33/228, 286, 290, 291, 292, DIG. 21; 359/800; 362/119, 120
 See application file for complete search history.

(56) References Cited

U.S. PATENT DOCUMENTS

| | | | |
|---|---|---|---|
| 6,842,291 B2 * | 1/2005 | Bergen ............................. | 33/291 |
| 6,892,464 B2 * | 5/2005 | Ohtomo et al. .................. | 33/290 |
| 7,055,253 B2 * | 6/2006 | Kaneko ............................ | 33/290 |
| 7,127,822 B2 * | 10/2006 | Kumagai et al. ................ | 33/290 |
| 7,503,123 B2 * | 3/2009 | Matsuo et al. ................... | 33/290 |
| 2001/0039740 A1 * | 11/2001 | Kaneko et al. .................. | 33/290 |
| 2004/0163266 A1 * | 8/2004 | Kaneko ............................ | 33/290 |
| 2008/0110037 A1 * | 5/2008 | Hayase et al. ................... | 33/290 |

(Continued)

FOREIGN PATENT DOCUMENTS

| | | |
|---|---|---|
| DE | 19651251 C2 | 6/1997 |
| DE | 11 2008 003 912 T5 | 5/2011 |
| EP | 1 626 833 B1 | 10/2006 |

*Primary Examiner* — G. Bradley Bennett
(74) *Attorney, Agent, or Firm* — Kilpatrick Townsend & Stockton LLP

(57) ABSTRACT

The present invention relates to a light beam emission device for a measuring device for changing the optical properties of a light beam as well as to a corresponding method and to a measuring instrument which uses the light beam emission device, wherein the optical properties of the light beam can be changed automatically thereby from one state to another state. The light beam emission device comprises a base body with an opening for the passage of the light beam; a head which is arranged rotatably around a rotation axis on the base body, and which corresponds substantially to the propagation direction of the light beam through the base body; an optical element, which is arranged turnably around a turning axis on the head; and a turning mechanism for producing a turning of the optical element around the turning axis; wherein the turning mechanism is designed to turn the optical element to a first position and to a second position, second position in which the optical element is located in the light beam, so that the optical properties of the light beam are changed depending on the function of the optical element.

17 Claims, 5 Drawing Sheets

(56) References Cited

U.S. PATENT DOCUMENTS

| | | |
|---|---|---|
| 2011/0141488 A1 | 6/2011 | Schumacher et al. |
| 2013/0167386 A1* | 7/2013 | Peng ................................ 33/290 |
| 2014/0047724 A1* | 2/2014 | Winistorfer et al. ............ 33/228 |
| 2014/0202011 A1* | 7/2014 | Munroe et al. .................. 33/228 |

* cited by examiner

LIGHT BEAM EMISSION DEVICE FOR A MEASURING DEVICE AND METHOD FOR CHANGING THE OPTICAL PROPERTIES OF A LIGHT BEAM

CROSS-REFERENCE TO RELATED APPLICATIONS

The present application claims priority to German Patent Application No. 10 2011 085 761.3, filed Nov. 4, 2001, the entire contents of which are incorporated herein by reference in their entirety for all purposes.

FIELD OF THE INVENTION

The present invention relates to a light beam emission device for a measuring device for changing the optical properties of a light beam as well as to a corresponding method and to a measuring instrument which uses the light beam emission device, wherein the optical properties of the light beam can be changed automatically thereby from one state to another state.

BACKGROUND

Various types of measuring instruments are used for measuring distances and angles between objects. Here, several conventional measuring instruments, such as surveying instruments, for example, use a laser light source for measuring the distance from or the position of an object by carrying out an electro-optical measurement.

A special measuring instrument, the leveling apparatus or laser leveling apparatus, can measure, for example, with the aid of a measuring rule, differences in height and establish height horizons. For example, a leveling apparatus comprises a targeting telescope which, using a level or a pendulum compensator, can be oriented perpendicularly to the plumb line direction. In addition to the measurement of positions, particularly of differences in height, horizontal surfaces or vertical surfaces can also be established.

To measure distance or position, the user must verify that the laser beam of the laser light source actually impinges on the object at a desired position. However, a laser point which impinges, for example, on a wall, is usually very small, and in a Z mode (i.e., a through beam is horizontal and a deflected beam orthogonal to said through beam), in the case of a large distance, a user may have difficulties finding the laser point with the naked eye or with a conventional photodetector. In addition, the intensity of the laser beam decreases over the distance, so that the intensity of the light that is scattered back by the wall decreases further.

Therefore it can be very expensive and sometimes even impossible to find the laser point with the eye or by moving a photodetector in a target area, owing to the small size of the laser point and of the distance from the laser source.

Furthermore, finding a small laser point becomes even more complicated under outside conditions in the field, such as, for example, ambient light, snow, rain and wind, where a rapid and reliable detection is desirable.

A positioning device and a positioning method that make it possible to find a center of a laser beam more rapidly and more easily, particularly by using a fanned laser beam or fan-like laser beam, is described, for example, in the German patent application having the reference DE 11 2008 003 912.7.

The generation of a fanned laser beam is, however, not trivial. Since a measurement of a distance or a measurement of an angle is not possible with a fanned laser beam or a similarly uncollimated light beam, one must provide either different light sources for the fanned laser beam and an unchanged laser beam, or a way has to be found to introduce an optical element into the laser beam and remove it therefrom, as needed. Such a mechanism is not only helpful in generating a fanned laser beam, but it can also be used to change the propagation direction of a laser beam or other optical properties.

A laser beam which has been fanned out by swiveling in a cylindrical lens can generate a light cone by rotation of the cylindrical lens in the laser beam, so that, using an appropriate emission device for a light beam or for a laser beam, several basic conditions with regard to geometry and user friendliness have to be taken into consideration.

There is a need therefore to provide a light beam emission device for a measuring instrument and a corresponding method which make it possible to change the optical properties of a light beam in a simple and reproducible manner.

SUMMARY

According to an embodiment, a light beam emission device for a measuring instrument for changing the optical properties of a light beam comprises a base body with an opening for the passage of the light beam, a head which is arranged rotatably around a rotation axis on the base body, axis which corresponds substantially to the propagation direction of the light beam through the base body, an optical element which is arranged turnably around a turning axis on the head, and a turning mechanism for producing a turning of the optical element around the turning axis. The turning mechanism is designed to turn the optical element to a first position and to a second position, in which second position the optical element is located in the light beam, so that the optical properties of the light beam are changed depending on the function of the optical element. Accordingly, it is possible to turn an optical element from a first position to a second position into the light beam, and so that the optical properties of the light beam are changed by the optical element; for example, a point of a light beam becomes a line, which generates a light cone by rotation. In particular, the light beam emission device allows the changing of the optical properties of a light beam during the rotation of the head with the optical element, wherein the swiveling in and out of the optical element can be controlled automatically without touching the emission device.

According to another embodiment, the turning mechanism is designed to turn the optical element by a rotation of the head around the rotation axis relative to the base body around the turning axis. Accordingly, the rotation of the head can be used in order to turn the optical element around the turning axis using appropriate means, so that no electrical motor or other drive in the head of the emission device is needed.

According to another embodiment, the first position corresponds to a position in which the optical element is located outside of the light beam. Thus, it is possible to prevent the light beam from being influenced by the optical element.

According to another embodiment, the turning mechanism is designed to turn, depending on the rotation direction of the head around the rotation axis, the optical element from the first position to the second position, or from the second position to the first position. Thus, the position of the optical element can be changed by setting the rotation direction.

According to another embodiment, the turning mechanism comprises a swing which is coupled turnably around the turning axis to the head, and which is connected to the optical element. Thus, the optical element can be moved from one position to another position by means of a mechanical element, such as the swing.

According to another embodiment, the turning mechanism comprises a lifting device which is arranged movably on the base body and touches the swing in a lifted state, in order to turn the optical element which is connected to the swing during a rotation around the rotation axis. Thus, the rotation movement of the head around the rotation axis can be used to turn the optical element which is attached to the swing, which can be controlled by the lifting device on the base body that is by an element that is not rotating or turning.

According to another embodiment, the swing and the lifting device each have a cog, cogs which engage in the lifted state during a rotation. Thus, a contact can be established in a simple manner between a lifting device attached to the base body and the swing attached to the head, in order to turn the optical element.

According to another embodiment, the lifting device has an electromagnet for producing the lifted state. Thus, a simple electronic control of the lifting device is possible.

According to another embodiment, the swing has an apron which, in case of contact with the lifting device, loosens a latching of the swing, so that the swing is freely turnable around the turning axis. Thus, by means of a simple mechanical contact, a latching can be loosened, which otherwise is used to hold the optical element in a position.

According to another embodiment, the turning mechanism comprises a measurement body which is turnably coupled to the head and turnable around the turning axis, and which is connected to the optical element, and turns the optical element around the turning axis to the first or to the second position, depending on the rotation speed. Thus, by exploiting the centrifugal force during the turning of the head, the position of the optical element can be changed, which makes it possible to dispense with a lifting device or another device on the base body.

According to another embodiment, the head has an additional optical element which deflects at least portions of the light beam in a direction which is substantially orthogonal to the rotation axis. Thus, the head can split the light beam into two portions, for example, which can be used for different measurements.

According to another embodiment, the turning mechanism is designed to turn the optical element to the second position, position in which the optical element is located in the at least partially deflected light beam, so that the optical properties of the light beam are changed depending on the function of the optical element. Thus, the optical properties of the partially deflected light beam can also be changed, which allows a flexible use of the emission device.

According to another embodiment, the light beam emission device comprises a multifunctional unit which contains the optical element and is arranged turnably around a turning axis on the head, in order to turn the multifunctional unit with the optical element to the first position, position in which the optical element is located outside and another portion of the multifunctional unit is located inside the light beam. Thus, different functions can be selected which change the optical properties of the light beam differently. For example, in the case of a first position, the light beam passes through the multifunctional unit, for example, a glass body, without being changed by said unit, and, in the case of a second position, through the optical element which is contained in the multifunctional unit, whereby the light beam is changed.

According to another embodiment, the other portion of the multifunctional unit changes the optical properties of the light beam depending on the optical function thereof. Thus, a flexible changing of the optical properties of a light beam is possible.

According to another embodiment, the function of an optical element includes at least one of the following: weakening, focusing to a point, fanning out, focusing to a line, deflecting, and filtering. Thus a flexible use of the light beam emission device with an optical element for different applications is possible.

Another embodiment of the invention relates to a measuring instrument, such as, for example, a leveling apparatus and particularly a laser leveling apparatus, which contains the light beam emission device described above. Thus, an improved measuring instrument can be provided, whose light beam or laser beam can be found easily and rapidly.

In a further embodiment, a method is described for changing the optical properties of a light beam of a light beam emission device of a measuring instrument with a base body and with a head. The method comprises rotating the head relative to the base body around a rotation axis which substantially corresponds to the propagation direction of the light beam through the base body; and turning, by a rotation of the head around the rotation axis, an optical element which rotates with the head and is arranged turnably around a turning axis on the head, wherein the optical element is turned to a position in which the optical element is located in the light beam, so that the optical properties of the light beam are changed depending on the function of the optical element. As a result, advantages similar to those described above can be achieved.

Additional advantageous characteristics of the invention are disclosed in the claims and described in further detail below.

DETAILED DESCRIPTION

Preferred embodiments of the invention are described in reference to the figures. It is noted that the following description contains merely examples and must not be interpreted as limiting the invention.

Embodiments of the invention relate generally to devices for changing the optical properties of a light beam, for example, for deflecting, weakening, focusing, fanning out or the like, which can be achieved by turning an optical element into the light beam using an appropriate mechanism. Here, the turning occurs around a turning axis which is substantially orthogonal to the propagation direction of the light beam, so that the light beam impinges on the beam shaping or beam changing surface, is reflected (at least partially) by said surface and/or allowed to pass through and changed by said surface. The emission device here comprises substantially two portions, a base body, and a head which is rotatably arranged relative to the base body on said base body, in order to rotate around a rotation axis.

According to a special example, the emission device can be used with a laser emitter of a measuring instrument, wherein the optical element represents a cylindrical lens or another refraction structure, a diffraction structure (a lattice) or an opening (aperture) in the laser beam for fanning the laser beam out and arranged appropriately for rotating around the direction of propagation, so that, in the case of a rotation, the fan-like laser beam generates a light cone having a propagation axis as center axis.

Figure 1:
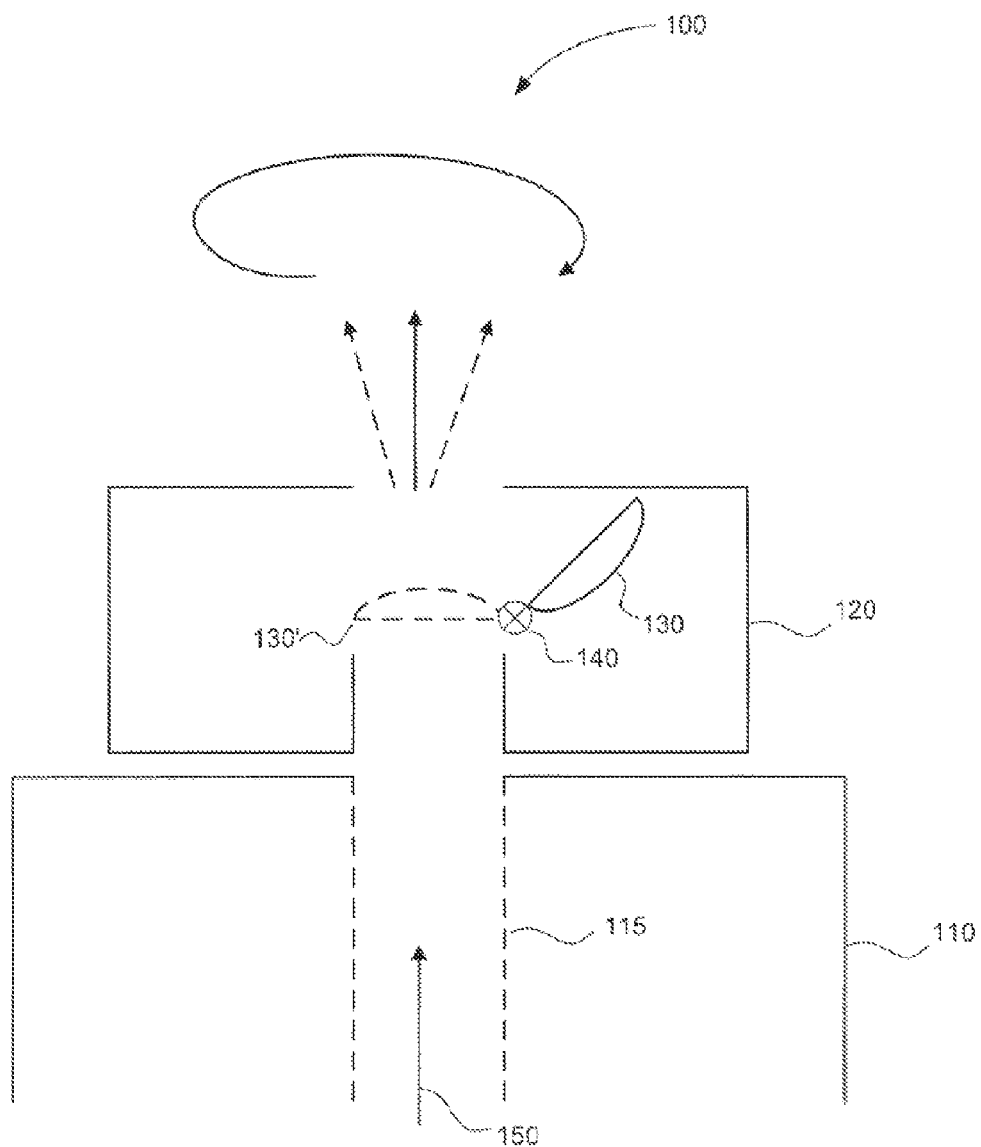
FIG. 1 represents a light beam emission device for a measuring instrument according to an embodiment of the invention.

FIG. 1 represents elements of a light beam emission device 100 according to an embodiment of the invention, comprising a base body 110, a head 120, an optical element 130, and a turning mechanism 140.

The base body 110 has an opening 115 for the passage of a light beam. For example, the base body 110 can be arranged in a measuring instrument, such as a leveling apparatus, which has a laser emitter or a similar light source, such as a narrow-band LED, for example, in order to carry out height, distance or angle measurements, or indicate surfaces. Here, the light beam emitted by the laser emitter, which is thus preferably a laser beam, can be guided through the opening 115 in such a manner that it is parallel to a rotation axis or substantially coincides with said rotation axis.

The head 120 is arranged rotatably around the rotation axis on the base body 110, rotation axis which, as mentioned, corresponds substantially to the propagation direction of the light beam through the base body 110. Thus, the head 120 is a rotor head which is attached, for example, at the upper end of a cylindrical tube which is rotatably arranged in the opening of the base body 110.

As shown in FIG. 1, an optical element 130 is arranged on the head 120 in such a manner that it is turnable around a turning axis. In the example shown in FIG. 1, the turning axis is a normal to the plane of the drawing and substantially orthogonal to the rotation axis which, as mentioned above, substantially corresponds to the propagation direction of the light beam, direction which is marked with reference numeral 150. Depending on the design, the turning axis can also be arranged at another angle relative to the rotation axis. The optical element 130 is a beam shaping body or surface, for example, and it is represented as an optical lens in FIG. 1. The optical element is coupled to the head 120 in such a manner— or it is a portion of the head—that the optical element 130 rotates around the rotation axis, when the head 120 rotates. If a cylindrical lens is used as optical element 130, it is thus possible, by rotation of the light beam which has been fanned out by the cylindrical lens, to generate a light cone having the propagation axis as center axis of the rotation. The fanned light beam is indicated with broken arrows in FIG. 1.

In order to cause a turning of the optical element 130 around the turning axis, a turning mechanism 140 is provided. The turning mechanism 140 is designed to turn the optical element to a first position and to a second position, second position in which the optical element is located in the light beam, so that the optical properties of the light beam are changed depending on the function of the optical element.

In the case of the cylindrical lens, the optical properties of the light beam are therefore changed to the effect that said light beam is fanned out in one direction. Thus, a distinction can be made between two states, namely a state corresponding to a first position, in which the optical element is located outside the light beam, i.e., the light beam passes by a beam shaping body without being influenced, and a second state corresponding to a second position, in which the optical element is located in the light beam, so that the light beam is influenced by the beam shaping body, and the optical properties are changed depending on the reproduction function of the optical element.

In other words, this means that the turning mechanism can be designed to turn the optical element to a first position, in which the optical element is located outside the light beam. The first state is shown in FIG. 1 by the position of the optical element 130, and the second state is shown in FIG. 1 by the optical element 130' drawn with broken lines.

If only two positions are to be assumed by the optical element, the turning mechanism can be designed as a simple folding mechanism. However, various optical elements can also be arranged on the turning axis, so that, depending on the extent of the turning, different optical elements in the light beam change the optical elements thereof.

According to an embodiment which is described in further detail below in reference to FIGS. 3a and 3b, the turning mechanism is designed to turn the optical element by a rotation of the head around the rotation axis relative to the base body around the turning axis. For example, the turning mechanism consists of two portions, a portion on the base body, and another portion on the head, which work together in such a manner that, during a rotation of the head, and consequently of the second portion relative to the first portion, the optical element 130 is turned. In particular, the turning mechanism can be designed to turn the optical element 130, depending on the rotation direction of the head around the rotation axis, from the first position to the second position or from the second position to the first position.

However, the turning mechanism 140 can also comprise merely one portion and be turnably connected to the head, and it can have a measurement body which is turnable around the turning axis. The turnable measurement body is here again connected to the optical element, so that the latter can be turned, depending on the rotation speed around the rotation axis, around the turning axis to the first or to the second position. Here, the centrifugal force on the measurement body is exploited to cause the turning around the turning axis. For example, in the case of this turning due to inertia, a first position of the optical element is reached, as a result of a rotation speed of zero or an excessively low rotation speed around the rotation axis, and a second position of the optical element is reached as a result of a rapid rotation around the rotation axis, or vice versa.

Thus, different turning mechanisms can be provided, which cause a turning of the optical element around the turning axis, without the use of an electrical motor in the head or of a complicated drive between the base body and the head.

Figure 2:
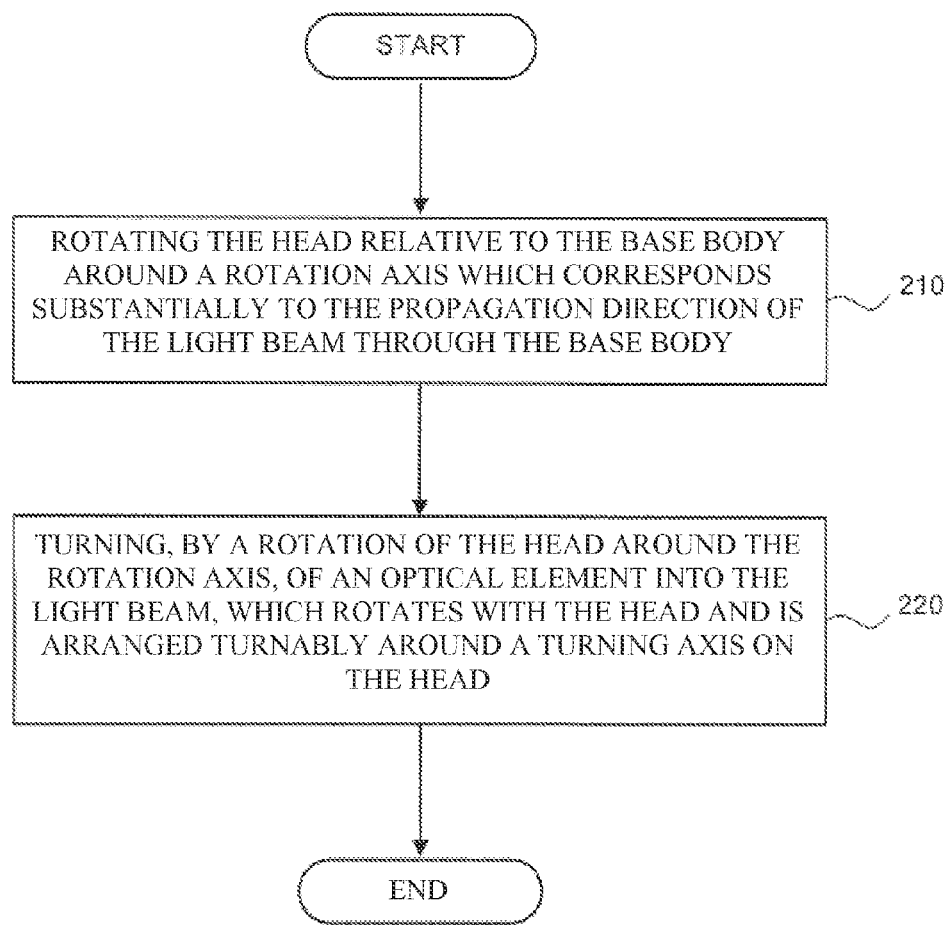
FIG. 2 represents steps or processes of a method for changing the optical properties of a light beam according to an embodiment of the invention.

Below, in reference to FIG. 2, a method is described for changing the optical properties of a light beam through a light beam emission device of a measuring instrument, such as, for example, the light beam emission device 100. FIG. 2 represents a flow chart, in reference to the emission device 100 just to simplify the description.

In a first step 210, when the operation is started, the head 120 rotates relative to the base body 110 around a rotation axis which substantially corresponds to the propagation direction of the light beam through the base body. For example, this rotation can be produced in that the head 120 is driven by an electrical motor, which is described in further detail in reference to FIG. 3.

In a second step 220, the optical element 130, which rotates with the head and is arranged turnably around a turning axis on the head, is turned by rotation of the head about the rotation axis. Here, the turning axis is substantially orthogonal to the rotation axis.

As described above, the turning can be achieved, for example, by a rapid rotation of the head or by a certain working together of portions of the turning mechanism, so that the optical element is turned to a position in which the optical element is located in the light beam, and the optical properties of the light beam are changed depending on the function of the optical element.

Figure 3A:
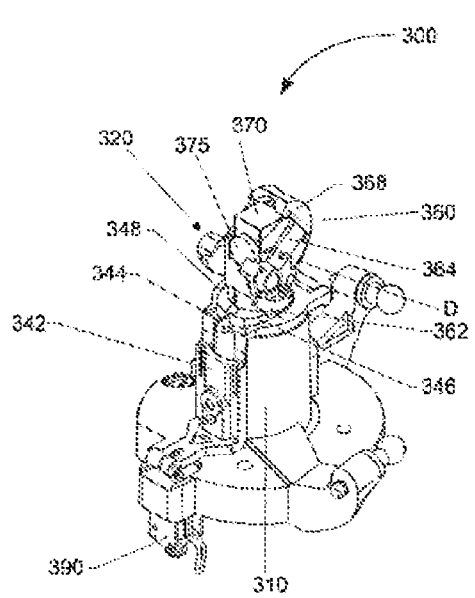
FIGS. 3a and 3b represent a side view or a cross-sectional view of a light beam emission device according to a specific embodiment.
Figure 3B:
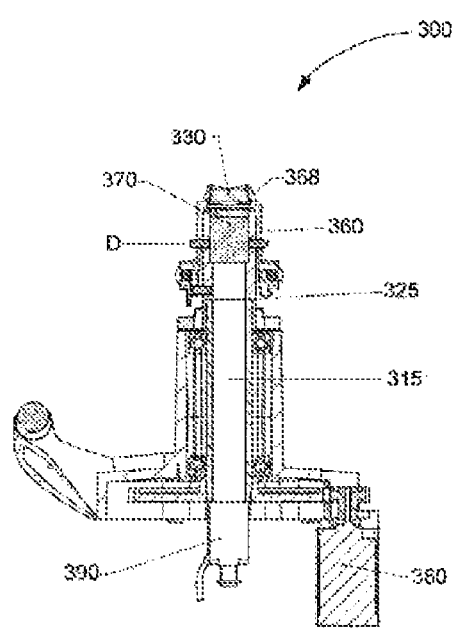

FIGS. 3a and 3b represent in detail a side view or a cross-sectional view of a light beam emission device according to a specific embodiment.

The light beam emission device 300, which is represented in FIGS. 3a and 3b, is a detailed example of the light beam emission device 100 of FIG. 1. Similar elements are marked with similar reference numerals.

As in FIG. 1, the light beam emission device 300 comprises a base body 310, a head 320, an optical element, here a lens 330, and a turning mechanism. In this example, the turning mechanism substantially comprises a lifting device 342 on the base portion 310 and a swing 360 on the head 320.

The lifting device 342 comprises a right and a left ramp 346, 348 as well as a cog 344 and a actuation rod, and the lifting device 342 can assume a low position and a lifted position, which can be achieved by appropriate controlling of an electromagnet (solenoid) 390. For example, by switching the electromagnet 390 on, the slide-shaped actuation rod of the lifting device 342 can lift the left and the right ramp 346, 348 as well as the cog 344. Thus, the electromagnet 390 can produce a lifted state of the lifting device.

The swing 360, which is arranged on the head 320, comprises the swing cog 362, the arm 364, and the swing attachment 368. In the example shown in FIGS. 3a and 3b, a lens 330 is inserted as an optical element in the swing attachment 368. The head 320 is connected to a rotor tube 325 which, as shown in FIG. 3b, can be coupled by means of a drive to the motor 380. This coupling allows the rotation of the head 320 around the rotation axis which extends along the opening 315. In the head 320, a prism 370 can be arranged furthermore, in order to reflect a portion of a light beam orthogonally to the propagation direction.

If a laser emitter is used as light source in a measuring instrument, the light beam emission device can be arranged in such a manner that the light beam enters the opening 315 from the bottom along a vertical direction in FIG. 3b and impinges on the prism 370 after passing through the opening. On the prism 370, a portion of the vertically propagating light is deflected and passes through the disk 375. The remainder of the light beam which continues to propagate in the vertical direction, depending on the position of the lens 330, passes through said lens (FIG. 3b) or past said lens (FIG. 3a). In FIG. 3a, the swing 360 is turned in such a manner that the lens 330 is located in the first position, and in FIG. 3b the swing is turned in such a manner that the lens 330 is located in the second position.

As shown in FIGS. 3a and 3b, the swing 360 of the turning mechanism is coupled or connected turnably around the turning axis D to the head, wherein the swing 360 again is connected to the optical element, so that a turning of the swing leads to a position change of the lens 330.

To turn the swing 360 in the example shown in FIGS. 3a and 3b, the lifting device is moved into a lifted state. The lifting device with slide-shaped actuation rod, device which is attached movably on the base body 310, touches the swing 360 in the lifted stage, in order to turn the optical element, i.e., the lens 330, which is connected to the swing 360, around the turning axis during a rotation of the head around the rotation axis. If the lifting device 342 and the swing 360 are in contact, and the swing rotates with the head relative to the base body 310, the swing cog 362 and the cog 344 of the lifting device 342 engage in the lifted state.

In detail, the swing 360 has an apron on whose end the swing cog 362 is located, and, in case of contact with the lifting device 342, the apron is pressed slightly outward by the ramp of the lifting device, so that, as a result of this contact, a latching of the swing is loosened, and the swing is freely turnable around the turning axis. After the latching of the swing 360 has been loosened, and the swing cog 362 engages with the cog 344, the swing turns around the turning axis.

The swing 360 has substantially two functions. A first function consists in that the lens 330 is folded from a first position to a second position or from a second position to the first position. A second function consists in that the apron of the swing can latch or unlatch the mechanism, in that the apron extends along the left or the right ramp 346, 348, and the arm 364 of the swing 360 bends.

Below, an example of a sequence of the steps in the process of switching the optical element 330 from one position to another is described.

In a starting position, the lens 330 is folded back. Then, the electromagnet 390 is switched on, and the slide-shaped actuation rod of the lifting device 342 moves upward.

At the same time or shortly before or after, the motor 380 for rotating the head 320 is switched on, so that the head 320 moves clockwise seen from above, for example. The apron of the swing 360 then extends along the right ramp 346, and the arm 364 of the swing is bent up and pressed out of the latching. The friction leads to the apron rolling off the sickle-shaped counter surface of the actuation rod, and the swing 360 starts to tilt.

When the cog 362 of the apron and the cog 344 of the actuation rod engage, the swing 360 tilts into the end position, in this example into the second position in which the lens 330 is located in the light beam, so that the optical properties are changed depending on the function of the lens. Then, the apron slides off on the left ramp 348, and the arm 364 of the swing 360 latches.

The folding back of the lens functions similarly, in that the rotation direction of the head 320 is shifted by the motor 380 in a counterclockwise direction, for example.

The above-described prism 370 represents a second optical element on the head 320, and, as mentioned above, it can also be omitted or replaced by another optical element having another function. It is preferable to use a second optical element in the position of the prism 370, optical element which deflects at least portions of the light beam in a direction that is substantially orthogonal to the rotation axis. Thus, a setup of a plane that is vertical to a horizontal plane can be represented optically, if one assumes that the horizontal plane can be defined by the original propagation direction of the light beam (Z mode).

The turning mechanism and particularly the swing 360 can be designed in such a manner that the first optical element can be turned to a position in which the first optical element is located in the at least partially deflected light beam (deflected by the second optical element), so that the optical properties of the deflected light beam are only or also changed depending on the function of the first or of the second optical element. Here, the second optical element changes the direction of the light beam, and the first optical element which has been turned in can change other optical properties by filtering, focusing or the like.

The first optical element or the combination of the first and second optical elements can also be replaced by at least one multifunctional unit containing an optical element, such as a glass body, for example, unit which is arranged turnably around the turning axis on the head. Due to this arrangement, the multifunctional units having at least one optical element can be turned to the first or to the second position.

Figure 4A:
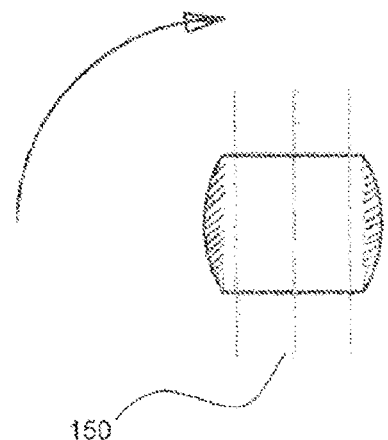
FIGS. 4a and 4b represent two orientations of a multifunctional unit with two optical elements.
Figure 4B:
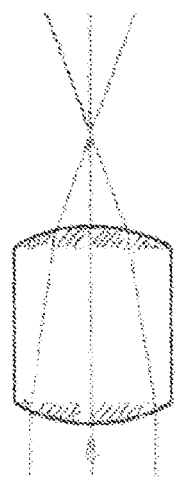

With the aid of FIGS. 4a and 4b as well as 5a and 5b, which show different multifunctional units, it can be explained how, in different positions of the optical element or elements of the multifunctional unit, the light beam passes through the multifunctional unit without being influenced by the optical elements.

In FIGS. 4a and 4b, the optical elements are represented with crosshatching and they form beam shaping bodies. In FIG. 4a, the optical elements are located outside the light beam, and another portion of the multifunctional unit, which, however, preferably does not change any optical properties of the light beam (a phase change due to the refractive index of the multifunctional unit is known and can be neglected or corrected here), is located within the light beam.

In contrast to the above, as shown in FIG. 4b, during the rotation of the multifunctional unit by 90°, the first optical element and the second optical element are turned into the light beam, so that the light beam is focused and changes its optical properties. Naturally, the portion of the multifunctional unit through which the light beam passes in FIG. 4a can be designed in such a manner that the optical properties of the light beam are changed depending on a certain optical function, but this is not provided for in these examples.

The function of an optical element includes at least one of the following: weakening, focusing to a point, fanning out, focusing to a line, deflecting, and filtering of a light beam. In the above-mentioned example of the cylindrical lens, a collimated light beam is focused to a line or fanned out. Furthermore, when using a filter, for example, unwanted wavelengths can be filtered out, in a multiple wavelength laser, for example.

In FIGS. 4a, 4b, 5a and 5b, the optical elements are beam shaping bodies or surfaces which are part of a glass body to be tilted, i.e., of an optical multifunctional unit. The beam-shaping bodies (beam shaping in this case means shaping a point to a line) are also crosshatched in FIGS. 5a and 5b.

In the simple case represented in FIGS. 4a and 4b, the multifunctional unit consists of a plane parallel plate which causes no beam deflection at all. The cylindrical lenses whose ends are ground have the effect that, as soon as the multifunctional unit is swiveled by 90°, a fanning out of the beam to a line occurs.

Figure 5A:
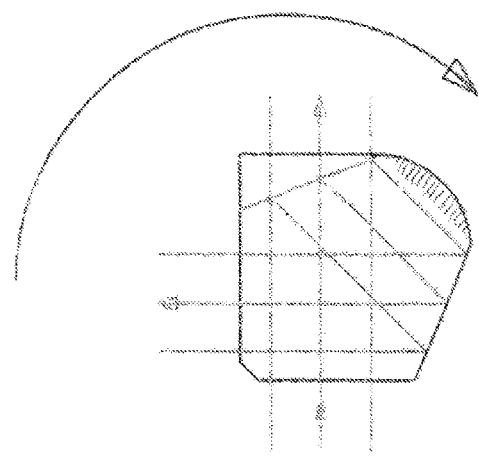
FIGS. 5a and 5b represent two orientations of another multifunctional unit with an optical element.
Figure 5B:
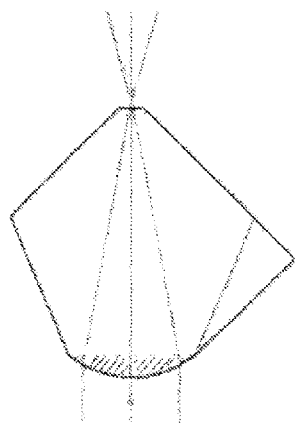

In the case of FIGS. 5a and 5b, the multifunctional unit is a multifunctional prism, namely a two-beam prism, which produces a horizontal and a vertical beam in a known manner. By turning by 135°, the lens-shaped body (crosshatched) and the planar surface facing said body are tilted into the vertical beam, whereby a line can be produced again. Functionally speaking, this almost corresponds to a two-beam prism which has a cylindrical lens that has been tilted before the vertical beam.

Additional multifunctional units are conceivable, such as complicated multifunctional pentaprisms, or complex optical units having several optical elements and combinations thereof, for example. Numerous functions that describe optical reproduction functions can be represented by one multifunctional unit.

Thus, the turning mechanism can be designed not only to turn an individual optical element, but also a multifunctional unit, which can comprise the functions of the prism 370 and of the lens 330. If the multifunctional unit is to be swiveled instead of the lens, i.e., the simple optical element, then, however, the requirements in terms of position are more stringent, because a tilting of the multifunctional unit around the horizontal beam axis (rolling) can lead to an angular error of the laser beam (the horizontal beam plane is then affected by error). In a simple optical element, such as a lens, tilting, however, plays no large role. Moreover, the weight of a lens is considerably lower, which also contributes to the stability of the apparatus, particularly if it falls on the ground. With a simple lens in the swivel attachment 368, a plastic sliding bearing with play can also be used.

As already mentioned, the light beam emission device 100 or 300 is used in a measuring instrument, such as, for example, a laser leveling apparatus which has a laser emitter or another similar light source for surveying structures or generating planes. Besides visible laser light, it is also possible to use infrared or near infrared laser light, as well as strong narrow-band light from one or more LEDs, so that several small and advantageous light sources are available.

The switching between a non-influenced light beam and a fanned light beam is advantageous particularly since the same light source and the same optical path for the two operating states can be chosen, and thus an additional light source, such as a second laser diode for a fanned out beam is not needed.

Using the light beam emission device 100 or 300, an optical property of the emitted light beam can be changed in a simple and convenient manner. As described above, it is possible, for example, to choose rapidly between a simple collimated light beam and a fanned light beam which leads to a light cone by rotation, thereby simplifying the detection of the light beam at a remote site.

Furthermore, a control unit for the emission device can be provided, which controls the motor 380 and the electromagnet 390 in accordance with the desired position of the swing. The function of the control unit can also be implemented in a microprocessor of the measuring instrument accommodating the emission device.

Alternatively, the control unit can be implemented in the form of a computer, a field programmable gate array (FPGA) or an integrated circuit, such as, for example, an ASIC (application specific integrated circuit) or software or an appropriate combination of the above, although it is not limited to such. In particular, the steps described in FIG. 2 can be implemented as functions of the control unit. These functions can be embodied as a software program, and implemented by the microprocessor or other circuits and a memory, such as, for example, any type of RAM, ROM, hard disk, EEPROM, flash memory, etc. A program code that is stored in the memory can be a program with instructions, designed to cause the microprocessor or other circuits to carry out the above-described steps.

As described above, the above embodiments and examples allow a simple and rapid change from one position to another position of an optical element, so that the optical properties of a light beam can be changed in a simple manner by automatic control. As a result, it is possible to switch between different operating states, namely an operating state in which the light beam is not influenced and can be used for measuring an angle, distance or height, and another operating state in which the light beam is changed in such a manner that it can be detected more easily at a certain distance.

It is recognized that various modifications and variations of the described light beam emission devices and of the measuring instruments, as well as of the methods are possible without leaving the scope of the invention.

The invention has been described in reference to certain embodiments and examples which are intended to be illustrative and nonlimiting. The person skilled in the art recognizes that numerous different combinations of hardware, software and firmware are appropriate for carrying out the invention, and that different materials can be used for producing the emission device.

Beyond this, other implementations of the invention will become apparent to the person skilled in the art when considering the description and the embodiment of the invention disclosed here. It is provided that the description and the examples must be considered merely exemplary. Therefore, it should be recognized that the inventive aspects also lie in fewer than all the characteristics of the above disclosed implementation or configuration. Thus, the true scope of the invention is presented in the following claims.

What is claimed is:

1. Light beam emission device for a measuring instrument for changing the optical properties of a laser beam, comprising
   a base body with an opening for the passage of the light beam;
   a head, which is arranged rotatably around a rotation axis on the base body, which corresponds substantially to the propagation direction of the light beam through the base body;
   an optical element, which is arranged turnably around a turning axis on the head; and
   a turning mechanism for producing a turning of the optical element around the turning axis; wherein
   the turning mechanism is designed to turn the optical element to a first position and to a second position, in which second position the optical element is located in the light beam, so that the optical properties the light beam are changed depending on of the function of the optical element.

2. Light beam emission device according to claim 1, wherein the turning mechanism is designed to turn the optical element by a rotation of the head around the rotation axis relative to the base body around the turning axis.

3. Light beam emission device according to claim 1, wherein the first position corresponds to a position in which the optical element is located outside of the light beam.

4. Light beam emission device according to claim 1, wherein the turning mechanism is designed to turn, depending on the rotation direction of the head, around the rotation axis of the optical element from the first position to the second position or from the second position to the first position.

5. Light beam emission device according to claim 1, wherein the turning mechanism comprises a swing which is connected turnably around the turning axis to the head, and which is connected to the optical element.

6. Light beam emission device according to claim 5, wherein the turning mechanism comprises a lifting device which is attached movably on the base body, and which, in a lifted state, touches the swing, in order to turn the optical element connected to the swing during a rotation around the rotation axis.

7. Light beam emission device according to claim 6, wherein the swing and the lifting device each have a cog, cogs which, in the lifted state, engage during a rotation.

8. Light beam emission device according to claim 6, wherein the lifting device has an electromagnet for producing the lifted state.

9. Light beam emission device according to claim 6, wherein the swing has an apron which, in case of contact with the lifting device, loosens a latching of the swing, so that the swing can turn freely around the turning axis.

10. Light beam emission device according to claim 1, wherein the turning mechanism has a measuring body which is turnably connected to the head and turnable around the turning axis, and which is connected to the optical element and, depending on the rotation speed, turns the optical element around the turning axis to the first or second position.

11. Light beam emission device according to claim 1, wherein the head has an additional optical element, which deflects at least portions of the light beam in a direction which is substantially orthogonal to the rotation axis.

12. Light beam emission device according to claim 11, wherein the turning mechanism is designed to turn the optical element to the second position, position in which the optical element is located in the at least partially deflected light beam, so that the optical properties of the light beam are changed depending on the function of the optical element.

13. Light beam emission device according to claim 1, further comprising a multifunctional unit containing the optical element, which is arranged turnably around the turning axis on the head, in order to turn the multifunctional unit with the optical element to the first position, position in which the optical element is located outside and another portion of the multifunctional unit is located inside the light beam.

14. Light beam emission device according to claim 13, wherein the other part of the multifunctional unit changes the optical properties of the light beam depending on the optical function thereof.

15. Light beam emission device according to claim 1, wherein the function of the optical element includes at least one of the following:
   weakening, focusing to a point, fanning out, focusing to a line, deflecting, and filtering.

16. Measuring instrument, particularly laser leveling apparatus, with the light beam emission device according to claim 1.

17. Method for changing the optical properties of a light beam of a light beam emission device of a measuring instrument with a base body and a head, comprising
   rotating the head relative to the base body around a rotation axis which substantially corresponds to the propagation direction of the light beam through the base body; and
   turning, by a rotation of the head around the rotation axis, an optical element which rotates with the head and is arranged turnably around a turning axis on the head, wherein
   the optical element is turned to a position in which the optical element is located in the light beam, so that the optical properties of the light beam are changed depending on the function of the optical element.

* * * * *